United States Patent [19]

Prinz et al.

[11] Patent Number: 5,593,650
[45] Date of Patent: Jan. 14, 1997

[54] METHOD FOR PRODUCING A HIGH-DENSITY SALINE CESIUM AND RUBIDIUM SOLUTION

[75] Inventors: Horst Prinz, Friedberg; Hartmut Hofmann, Bad Soden; Klaus Köbele, Dietzenbach; Marion Wegner, Frankfurt am Main, all of Germany

[73] Assignee: Metallgesellschaft Aktiengesellschaft, Frankfurt am Main, Germany

[21] Appl. No.: 436,260

[22] PCT Filed: Nov. 10, 1993

[86] PCT No.: PCT/EP93/03143

§ 371 Date: Jul. 17, 1995

§ 102(e) Date: Jul. 17, 1995

[87] PCT Pub. No.: WO94/11303

PCT Pub. Date: May 26, 1994

[30] Foreign Application Priority Data

Nov. 11, 1992 [DE] Germany ............... 42 37 954.7

[51] Int. Cl.⁶ ........................... C22B 26/00
[52] U.S. Cl. ........................... 423/203; 423/165
[58] Field of Search ............... 423/189, 203, 423/165, 179; 106/771; 75/745

[56] References Cited

U.S. PATENT DOCUMENTS 3,207,571  9/1965  Berthold ...................... 423/202
3,489,509  1/1970  Johnson ....................... 423/189

FOREIGN PATENT DOCUMENTS 2588847  4/1987  France.

OTHER PUBLICATIONS

Chem. Abstract: 100:160074p, 1984, no month.
Chem. Abstract: 79:4949v, 1973, no month.
Chem. Abstract: 73:79009y, 1970, no month.
Tsuetnye Metallurgy, The Soviet J. Non–Ferrous Met., Bd. 2, Nr. 5, 1961, no month, pp. 57–59.

Primary Examiner—Steven Bos
Attorney, Agent, or Firm—Michael J. Striker

[57] ABSTRACT

The method of making a high density saline cesium and rubidium solution includes comminuting uncalcined pollucite and/or calcined lepidolite to a grain size of less than 0.1 mm; combining the comminuted material in the presence of water with $Ca(OH)_2$ at a mol ratio of $SiO_2$ to CaO of not less than 1:2; hydro-thermally decomposing at a temperature of 200° to 280° C., a pressure of 20 to 40 bar and with a suspension density of 4 to 15% by weight for from 1 to 3 hours to form a suspension containing insoluble solids; filtering the insoluble solids and washing to form a filtrate and concentrating the filtrate; blowing carbon dioxide into the concentrated filtrate to precipitate calcium carbonate and lithium carbonate and filtering the concentrated filtrate to separate the precipitated carbonates from a remaining solution; and then adding an acid or acid anhydride to the remaining solution until the pH of the remaining solution reaches about 6 and concentrating by evaporation to form the high density saline cesium and rubidium solution.

24 Claims, No Drawings

METHOD FOR PRODUCING A HIGH-DENSITY SALINE CESIUM AND RUBIDIUM SOLUTION

BACKGROUND OF THE INVENTION

The invention relates to a method for producing a high-density saline cesium and rubidium solution, i.e. a solution of a density of 1.6 to 3.3 g/cm$^3$, by hydro-thermal decomposition of cesium- and rubidium-containing minerals.

A method for the hydro-thermal decomposition of a pollucite-spodumene concentrate for obtaining cesium carbonate is known from the magazine "Tsvetnye Metally—The Soviet Journal of Non-Ferrous Metals", vol. II, No. 5, pp. 57 to 59 (1961). In the process, the calcined minerals are subjected to hydro-thermal decomposition in an aqueous Ca(OH)$_2$ solution at 220° C. and 20 atm pressure over a period of 4 hours, wherein optimum decomposition conditions are achieved with 3 mol Ca(OH)$_2$ per mol SiO$_2$. It was possible to obtain 88.3% of the cesium contained in the mineral and to produce a cesium salt of a purity of greater than 99% by recrystallization of the alumino-cesium alum. A method for the conversion of Cs$_2$CO$_3$ into CsHCO$_2$ is furthermore known from the Chemical Abstracts article 79/4949v (1973), wherein the carbonate is reacted with formic acid in water.

SUMMARY OF THE INVENTION

It is the object of the invention to provide a method which permits the cost-effective production of a high-density saline cesium and rubidium solution, i.e. a solution of a density of 1.6 to 3.3 g/cm$^3$, with a comparatively high yield of the cesium and rubidium from the employed minerals.

According to the invention the method of making a high density saline cesium and rubidium solution comprises comminuting uncalcined pollucite and/or calcined lepidolite to a grain size of less than 0.1 mm; combining the comminuted material in the presence of water with Ca(OH)$_2$ at a mol ratio of SiO$_2$ to CaO of not less than 1:2; hydro-thermally decomposing the comminuted material together with the Ca(OH)$_2$ at a temperature of 200° to 280° C., a pressure of 20 to 40 bar and with a suspension density of 4 to 15% by weight for a time period of one to three hours to form a suspension containing insoluble solids; filtering the insoluble solids from the suspension and washing the insoluble solids to form a filtrate and advantageously concentrating the filtrate; blowing carbon dioxide into the filtrate to precipitate calcium carbonate and lithium carbonate and filtering to separate the solid carbonates from a remaining solution; and then adding an acid or acid anhydride to the remaining solution until the pH of the remaining solution reaches about 6 and concentrating by evaporation to form the high density saline cesium and rubidium solution. The suspension density is defined as the concentration of the pollucite and/or the lepidolite as well as the undissolved CaO or Ca(OH)$_2$ in water.

In a preferred embodiment of the method the filtrate produced by the hydro-thermally decomposing is subjected to repeated, advantageously six, hydro-thermal decompositions in additional hydro-thermal decomposition batches in an autoclave.

In a surprising manner it is possible to obtain more than 80% by weight of the cesium and rubidium contained in the uncalcined pollucite and/or calcined lepidolite which have been comminuted to a grain size of less than 0.1 mm, hydro-thermally decomposed with Ca(OH)$_2$ at a decomposition temperature of 200° to 280° C. and a suspension density of 4 to 15 % by weight over a period of one to three hours, to convert them in a cost-effective manner to a high-density saline cesium and rubidium solution, if the filtrate obtained following the separation of insoluble solids is used at least three times in the hydro-thermal decomposition.

This embodiment of the method in accordance with the invention has the advantage that a solution with an at least three times higher content of cesium and rubidium is obtained because of the multiple use of the filtrate in the thermal decomposition, which needs to be less concentrated by evaporation to produce the high density saline cesium and rubidium solution, i.e. a solution of a density of 1.6 to 3.3 g/cm$^3$, and can therefore be produced more cost-effectively.

In preferred embodiments of the invention the uncalcined pollucite and/or calcined lepidolite is comminuted to a grain size of less than 0.04 mm and the hydro-thermal decomposition is performed at a temperature of 200° C. with Ca(OH)$_2$, at a suspension density of 15% by weight over a period of one hour.

In accordance with a preferred embodiment of the invention, stirring during decomposition is performed in such a way that sedimentation as well as flotation is prevented by the infusion of gas into the suspension. This can be accomplished either by a change of the direction of rotation of the stirrer at intervals or by an operation of the stirrer at timed intervals during decomposition.

The saline cesium and rubidium solutions are obtained in an advantageous manner when, for the neutralization of the decomposed solution remaining after the separation of calcium as well as lithium, formic acid, acetic acid, citric acid, hydrochloric acid, hydrobromic acid or sulfuric acid are used as acids, or carbon monoxide, molybdenum trioxide or tungsten trioxide as acid anhydrides.

It is particularly advantageous for producing a high density saline cesium and rubidium solution to employ the filtrate which was separated following hydro-thermal decomposition up to six more times in further decomposition batches. Furthermore, it is to be advantageous for the entire process to use the separated carbonates for the production of lithium and the insoluble solids remaining after hydro-thermal decomposition as an additive for raw cement meal. Because of this the proposed method becomes nearly free of waste products.

The density of the saturated saline cesium and rubidium solution can be varied over a wide range when saturated solutions of an alkali or earth alkali salt are admixed, provided the anions of both salt solutions are the same.

In an advantageous manner the saturated cesium and rubidium formate solutions produced in accordance with the method are mixed with saturated potassium formate solutions to provide a density of 1.6 to 2.26 g/ml, and the saturated cesium and rubidium bromide solutions produced in accordance with the method are mixed with saturated calcium bromide solutions to form saline solutions with densities between 1.68 and 1.81 g/ml.

The invention will be described in more detail by means of the following examples.

EXAMPLES

Test Material

| Contents of | Pollucite Original % | Lepidolite Calcined at 800° C. % |
|---|---|---|
| Cs | 23.5 | 0.56 |
| Rb | 0.97 | 3.3 |
| Al | 8.9 | 15.2 |
| Na | 1.07 | 0.24 |
| K | 1.09 | 7.2 |
| Li | 0.30 | 1.31 |
| Ca | 0.08 | n.d.* |
| $SiO_2$ | 51.6 | 52.3 |

*n.d. not determined

The following tests were performed with uncalcined pollucite and calcined lepidolite.

Example 1

In an autoclave of 300 l capacity, equipped with a stirrer and heated by means of a double-jacket containing high-temperature heating oil, wherein the temperature measurement took place by means of a thermo-element and the pressure measurement by means of a pressure gauge, 8.92 kg of pollucite (grain size less than 0.08 mm), 11.34 kg $Ca(OH)_2$ and 232.5 kg water (corresponding to an 8% by weight solution) were subject to a hydro-thermal decomposition. After heating to a set temperature of 230° C., this temperature was maintained for 3 h. During this time the reaction mixture was stirred at intervals (stirring for 1 min, 15 min rest periods). Following the reaction, it was cooled to room temperature. The filtration of the suspension was performed under increasing pressure up to 5 bar via a pressure filter. The filter cake was washed. A total of 251.8 kg of filtrate and rinsing water were obtained.

A further batch was treated identically with the first one, wherein 286.9 kg of filtrate and rinsing water were obtained.

The solutions of both batches were combined and analyzed.

|  | Content of kg | Yield % |
|---|---|---|
| Cs | 4.158 | 99.2 |
| Rb | 0.167 | 96.4 |
| Na | 0.175 | 91.7 |
| K | 0.194 | 100 |
| Li | 0.011 | 19.9 |

The clear solution comprising the filtrate and rinsing water was extensively concentrated by evaporation. Precipitation of solids occurred in the course of the progressive evaporation of water. After 517 kg of water had been evaporated, carbon dioxide was blown into the remaining suspension in order to precipitate calcium and lithium in the form of carbonate. Subsequently a clear filtration was performed by means of a nutsch filter and 21.35 kg of a yellowish-brown colored solution were obtained, which had a density of 1.367 g/ml at room temperature.

Formic acid was metered into the filtrate until a pH value of 6 had been reached. 1.742 kg of concentrated formic acid (98 to 100% by weight) were required for this. Subsequently the solution was further concentrated by evaporation. A boiling temperature of 108° C. occurred at the start and rose with continued evaporation.

A solution sample was removed at a boiling temperature of 118.6° C., cooled and the density determined to be 1.769 g/ml (room temperature). The following further boiling temperatures and densities were determined:

| Boiling temperature °C. | Density at 20° C. g/ml |
|---|---|
| 118.6 | 1.769 |
| 127.0 | 1.960 |
| 145.3 | 2.261 |
| 146.2 | 2.270 |
| 147.0 | 2.274 |

It was possible to obtain 8 kg of a saline cesium and rubidium solution of a density of 2.27 g/ml. The following material were contained in it in accordance with the analysis:

| Cs | 52.0% |
|---|---|
| Rb | 2.08% |
| Na | 2.19% |
| K | 2.43% |
| Ca | 32 g/t |
| Mg | 5 g/t |

Example 2

Hydro-thermal decomposition was performed in accordance with Example 1 with the difference, that the pollucite was comminuted to less than 0.04 mm and the hydro-thermal decomposition took place at 200° C. The result is compiled in Table 1.

Example 3

Hydro-thermal decomposition was performed in accordance with Example 1 with the difference, that the pollucite was comminuted to less than 0.1 mm and the hydro-thermal decomposition took place at 280° C. The result is compiled in Table 2.

Example 4

Hydro-thermal decomposition was performed in accordance with Example 1 in a 2 l autoclave with the difference, that the suspension density was set to approximately 15% by weight. The result is compiled in Table 3.

Example 5

Hydro-thermal decomposition was performed in accordance with Example 1 in a 2 l autoclave with the difference, that calcined lepidolite (800° C.) was used as the raw material and hydro-thermal decomposition was performed under the following conditions:

Comminution less than 0.1 mm
$SiO_2$:CaO 1:3
The result is compiled in Table 4

Example 6

The one-time decomposition of uncalcined pollucite or calcined lepidolite demonstrated by means of Examples 1 to 5 was replaced by the process in accordance with the invention.

Hydro-thermal decomposition in accordance with Example 1 was performed in a 2 1 autoclave with the difference that the filtrate was repeatedly used during the hydro-thermal decomposition. The results are compiled in Table 5.

In Table 5, columns 2 and 3 indicate the respective amounts of cesium and rubidium in respectively freshly used material. Column 4 indicates the amount of filtrate used in connection with the next decomposition batch. The relative and absolute amounts of cesium and rubidium which are concentrated in the filtrate can be found in Columns 5 to 8. Columns 9 and 10 contain the percentile portions of cesium and rubidium obtained from the amounts of minerals used in the respective decomposition batch.

Example 7

A high-density saline solution containing cesium and rubidium is prepared by reacting a hydroxide solution containing cesium and rubidium (6.285 kg, 50% by weight) obtained in accordance with example 6 with 2.277 kg tungsten trioxide, adding hydrogen peroxide (30% strength). The entire tungsten trioxide is dissolved by heating the suspension to the boiling point. The solution is evaporated until crystallization begins, is cooled and the precipitated crystallizate is separated. 6.085 kg of a cesium-, rubidium-tungstate solution of a density of 2.95 g/ml at 20° C. is obtained.

Example 8

Saturated saline solutions containing cesium and rubidium of a density of 1.6 to 2.26 g/ml are obtained when the cesium-, rubidium formate solution of Table 6 prepared in accordance the invention is mixed with a saturated potassium formate solution.

Example 9

Saturated saline solutions containing cesium and rubidium of a density of 1.68 to 1.81 g/ml are obtained when the cesium-rubidium bromide solution of Table 7 prepared in accordance with the invention is mixed with a saturated calcium bromide solution.

TABLE 1

Pollucite Decomposition with $Ca(OH)_2$
$SiO_2$:CaO = 1:2/8% Suspension/200° C./3 h Reaction time/
Grain less than 0.04 mm

| Charge Pollucite | | Yield | | | | | Yield related to the amount of pollucite | |
|---|---|---|---|---|---|---|---|---|
| Cs | Rb | Filtrate | Cs | | Rb | | Cs | Rb |
| kg | kg | kg | % | kg | % | kg | % | % |
| 4.192 | 0.173 | 629 | 0.66 | 4.146 | 0.028 | 0.173 | 98.9 | 100 |

TABLE 2

Pollucite Decomposition with $Ca(OH)_2$
$SiO_2$:CaO = 1:2/8% Suspension/280° C./3 h Reaction time/
Grain less than 0.1 mm

| Charge Pollucite | | Yield | | | | | Yield related to the amount of pollucite | |
|---|---|---|---|---|---|---|---|---|
| Cs | Rb | Filtrate | Cs | | Rb | | Cs | Rb |
| kg | kg | kg | % | kg | % | kg | % | % |
| 4.192 | 0.173 | 620 | 0.67 | 4.158 | 0.027 | 0.166 | 99.2 | 96.0 |

TABLE 3

Pollucite Decomposition with $Ca(HO)_2$
$SiO_2$:CaO = 1:2/15% Suspension/230° C./3 h Reaction time/
Grain less than 0.063 mm

| Charge Pollucite | | Yield | | | | | Yield related to the amount of pollucite | |
|---|---|---|---|---|---|---|---|---|
| Cs | Rb | Filtrate | Cs | | Rb | | Cs | Rb |
| g | g | g | % | g | % | g | % | % |
| 19.68 | 0.88 | 1391.3 | 1.24 | 17.31 | 0.059 | 0.82 | 88.0 | 93.5 |

TABLE 4

Lepidolite Decomposition with CaO
$SiO_2$:CaO = 1:3/230° C./3 h Reaction time/Calcine Lipidolite,
Grain less than 0.1 mm

| Charge Lepidolite | | Yield | | | | | Yield related to the amount of lepidolite | |
|---|---|---|---|---|---|---|---|---|
| Cs | Rb | Filtrate | Cs | | Rb | | Cs | Rb |
| g | g | g | % | g | % | g | % | % |
| 0.168 | 0.99 | 1620.5 | 0.0095 | 0.154 | 0.050 | 0.81 | 91.6 | 81.8 |

TABLE 5

Digestion of pollucite with Ca(OH)$_2$ and recycling
SiO$_2$:CaO mole ratio = 1:2/8% suspension/230° C./reaction time 3 hours/
particle size < 0.0063 mm

| Experim. No. | Feed | | | | Yield | | | | Yield based on feed pollucite | |
|---|---|---|---|---|---|---|---|---|---|---|
| | Pollucite | | Solution | | Filtrate | Cs | | Rb | | Cs | Rb |
| | Cs g | Rb g | Cs g | Rb g | g | % | g | % | g | % | % |
| V45/I | 12.3 | 0.55 | — | — | 1592.0 | 0.77 | 12.2 | 0.033 | 0.53 | 99.2 | 96.4 |
| V45/II | 12.3 | 0.55 | 9.81 | 0.42 | 1625.6 | 1.24 | 20.2 | 0.056 | 0.91 | 84.5 | 89.1 |
| V45/III | 12.3 | 0.55 | 15.81 | 0.71 | 1640.9 | 1.59 | 26.1 | 0.072 | 1.17 | 83.7 | 83.6 |
| V45/IV | 12.3 | 0.55 | 20.27 | 0.91 | 1709.2 | 1.11 | 29.3 | 0,079 | 1.35 | 73.4 | 80.0 |
| V45/V | 12.3 | 0.55 | 21.80 | 1.01 | 1661.4 | 1.82 | 30.3 | 0.087 | 1.44 | 69.1 | 78.2 |

TABLE 6

Mixture of a Saturated HCOOCs/Rb Solution Produced from
Pollucite with a Saturated HCOOK Solution at 20° C.

| Vol. % HCOOCs/Rb:HCOOK | % by weight HCOOCs/Rb:HCOOK | Density at 20° C. g/ml |
|---|---|---|
| 100:— | 100:— | 2.264 |
| 90:10 | 92.9:7.1 | 2.194 |
| 80:20 | 85.2:14.8 | 2.125 |
| 70:30 | 77.7:22.9 | 2.055 |
| 60:40 | 68.4:81.6 | 1.986 |
| 50:50 | 59.1:40.9 | 1.916 |
| 40:60 | 49.0:51.0 | 1.846 |
| 30:70 | 38.2:61.8 | 1.777 |
| 20:80 | 26.5:73.6 | 1.707 |
| 10:90 | 13.8:86.2 | 1.638 |
| —:100 | —:100 | 1.568 |

TABLE 7

Mixture of a Saturated Cs/RbBr Solution with a Saturated
CaBr$_2$ Solution

| Vol. % Cs/RbBr:CaBr$_2$ | % by weight Cs/RbBr:CaBr$_2$ | Density at 20° C. g/ml |
|---|---|---|
| 100:— | 100:— | 1.682 |
| 90:10 | 89.3:10.7 | 1.695 |
| 80:20 | 78.8:21.2 | 1.708 |
| 70:30 | 68.4:31.6 | 1.721 |
| 60:40 | 68.2:41.8 | 1.734 |
| 50:50 | 48.1:57.9 | 1.747 |
| 40:60 | 38.2:61.8 | 1.760 |
| 30:70 | 28.5:71.5 | 1.773 |
| 20:80 | 18.8:81.2 | 1.786 |
| 10:90 | 9.3:90.7 | 1.799 |
| —:100 | —:100 | 1.812 |

We claim:

1. A method of making a high density saline cesium and rubidium solution, said method comprising the steps of:
   a) comminuting at least one mineral selected from the group consisting of uncalcined pollucite and calcined lepidolite to a grain size of less than 0.1 mm to form a comminuted material;
   b) combining the comminuted material formed in step a) in the presence of water with Ca(OH)$_2$ at a mol ratio of SiO$_2$ to CaO of not less than 1:2;
   c) hydro-thermally decomposing the combined comminuted material from step 6 at a temperature of 200° to 280° C., a pressure of 20 to 40 bar and with a suspension density of 4 to 15% by weight for a time period of one to three hours to form a suspension containing insoluble solids;
   d) filtering the insoluble solids from the suspension formed in step c) and washing the insoluble solids to form a filtrate;
   e) blowing carbon dioxide into the filtrate to precipitate calcium carbonate and lithium carbonate;
   f) filtering the filtrate containing the precipitated calcium carbonate and lithium carbonate to form a remaining solution and solid carbonates; and
   g) adding an acid or acid anhydride to the remaining solution until the pH of the remaining solution reaches about 6 and then evaporating the pH adjusted remaining solution to form the high density saline cesium and rubidium solution.

2. The method as defined in claim 1, further comprising subjecting said filtrate produced by said hydro-thermally decomposing to repeated hydro-thermal decompositions.

3. The method as defined in claim 1, further comprising stirring at timed intervals during said hydro-thermally decomposing.

4. The method as defined in claim 1, further comprising stirring said suspension during said hydro-thermally decomposing and changing stirring rotation directions during said stirring.

5. The method as defined in claim 1, wherein said acid is selected from the group consisting of formic acid, acetic acid, citric acid, hydrochloric acid, hydrobromic acid and sulfuric acid and said acid anhydride is selected from the group consisting of carbon monoxide, molybdenum trioxide and tungsten trioxide.

6. The method as defined in claim 1, further comprising producing lithium from said lithium carbonate.

7. The method as defined in claim 1, further comprising adding said insoluble solids formed during the hydro-thermally decomposing to raw cement meal.

8. The method as defined in claim 1, further comprising mixing the high density saline cesium and rubidium solution with a saturated solution of an alkali metal salt or alkaline earth metal salt, wherein said saturated solution contains the same anions as said high density saline cesium and rubidium solution.

9. The method as defined in claim 1, further comprising concentrating the filtrate prior to blowing carbon dioxide into the filtrate.

10. A method of making a high density saline cesium and rubidium solution, said method comprising the steps of:

a) comminuting at least one mineral selected from the group consisting of uncalcined pollucite and calcined lepidolite to a grain size of less than 0.1 mm to form a comminuted material;

b) combining the comminuted material formed in step a) in the presence of water with $Ca(OH)_2$ at a mol ratio of $SiO_2$ to CaO of not less than 1:2;

c) hydro-thermally decomposing the combined comminuted material from step b at a temperature of 200° to 280° C., a pressure of 20 to 40 bar and with a suspension density of 4 to 15% by weight for a time period of one to three hours to form a suspension containing insoluble solids;

d) filtering the insoluble solids from the suspension formed in step c) and washing the insoluble solids to form a filtrate;

e) concentrating the filtrate to form a concentrated filtrate;

f) blowing carbon dioxide into the concentrated filtrate to precipitate calcium carbonate and lithium carbonate;

g) filtering the concentrated filtrate containing the precipitated calcium carbonate and lithium carbonate to form a remaining solution and solid carbonates; and then h) adding an acid or acid anhydride to the remaining solution until the pH of the remaining solution reaches about 6 to form the high density saline cesium and rubidium solution.

11. The method as defined in claim 10, further comprising subjecting said filtrate produced by said hydro-thermally decomposing to repeated hydro-thermal decompositions.

12. The method as defined in claim 10, further comprising subjecting said filtrate produced by said hydro-thermally decomposing to six hydro-thermal decompositions in additional hydro-thermal decomposition batches.

13. The method as defined in claim 10, wherein said comminuting continues until said grain size is less than 0.04 mm.

14. The method as defined in claim 10, wherein said temperature of said hydro-thermally decomposing is said 200° C.

15. The method as defined in claim 10, wherein said time period of said hydro-thermally decomposing is said one hour.

16. The method as defined in claim 10, wherein said suspension, density in said hydro-thermally decomposing is said 15% by weight.

17. The method as defined in claim 10, further comprising stirring at timed intervals during said hydro-thermally decomposing.

18. The method as defined in claim 10, further comprising stirring said suspension during said hydro-thermally decomposing and changing stirring rotation directions during said stirring.

19. The method as defined in claim 10, wherein said acid is selected from the group consisting of formic acid, acetic acid, citric acid, hydrochloric acid, hydrobromic acid and sulfuric acid and said acid anhydride is selected from the group consisting of carbon monoxide, molybdenum trioxide and tungsten trioxide.

20. The method as defined in claim 10, further comprising producing lithium from said precipitated lithium carbonate.

21. The method as defined in claim 10, further comprising adding said insoluble solids formed during the hydro-thermally decomposing to raw cement meal.

22. The method as defined in claim 10, further comprising mixing the high density saline cesium and rubidium solution with a saturated solution of an alkali metal salt or alkaline earth metal salt, wherein said saturated solution contains the same anions as said high density saline cesium and rubidium solution.

23. The method as defined in claim 10, wherein said high density saline cesium and rubidium solution is a saturated cesium and rubidium formate solution, and further comprising mixing said saturated cesium and rubidium formate solution with a saturated potassium formate solution to obtain a cesium- and rubidium-containing salt solution.

24. The method as defined in claim 10, wherein said high density saline cesium and rubidium solution is a saturated cesium and rubidium bromide solution, and further comprising mixing said saturated cesium and rubidium bromide solution with a saturated calcium bromide solution to obtain a cesium- and rubidium-containing salt solution.

* * * * *